Nov. 30, 1948. H. B. FUGE 2,454,968

SINGLE-PHASE INDUCTION MOTOR CONTROL SYSTEM

Filed July 13, 1945

Inventor
Harry B. Fuge
By William F. Stewart
Attorney

Patented Nov. 30, 1948

2,454,968

UNITED STATES PATENT OFFICE 2,454,968

SINGLE-PHASE INDUCTION-MOTOR CONTROL SYSTEM

Harry B. Fuge, Somerville, N. J., assignor to The Singer Manufacturing Company, Elizabeth, N. J., a corporation of New Jersey Application July 13, 1945, Serial No. 604,961

9 Claims. (Cl. 318—203)

1

This invention relates to improved motor control systems including the electrical braking of induction motors and more particularly to systems involving the dynamic braking of single-phase induction motors of the split-phase type in which the main and auxiliary windings are connected in series across the supply circuit.

The term electrical braking is used herein to distinguish from mechanical braking and refers to systems which depend upon changes in the electrical connections of the motor and the associated circuits and includes dynamic braking and plugging.

It is generally recognized in the art of electrical braking that the fastest method of braking is to plug the motor and then to disconnect the supply source therefrom when the motor has reached standstill. The disadvantages presented by this method are, (1) special devices, requiring mechanical attachment to the motor shaft, are generally necessary to detect the standstill condition and (2) these devices do not always perform satisfactorily but sometimes allow the motor to reverse, with disastrous results.

On the other hand, it is well known that dynamic braking, while not so rapid as is plugging in its decelerating effect, nevertheless, has the advantage of being inherently non-reversing because the dynamic braking effort goes to zero at standstill.

It is an object to this invention to provide a novel electrical braking control system for a single-phase induction motor, which system shall have substantially the high decelerating effect of plugging and the inherent protection against reversal afforded by dynamic braking.

It is a further object of this invention to provide an improved electric braking system of great simplicity and ruggedness which shall not require coupling of any special devices to the motor shaft, but shall necessitate simply the suitable addition to a conventional circuit of a single-pole single-throw switch.

With the above and other objects in view, as will hereinafter appear, the invention comprises the devices, combinations and arrangements of parts hereinafter set forth and diagrammatically illustrated in the accompanying drawings of a preferred embodiment of the invention, from which the several features of the invention and the advantages attained thereby will be readily understood by those skilled in the art.

In the accompanying drawings:

Fig. 1 is a diagrammatic illustration of a manually-controlled circuit for dynamically braking

2 a split-phase induction motor and embodying the invention.

Figure 1:
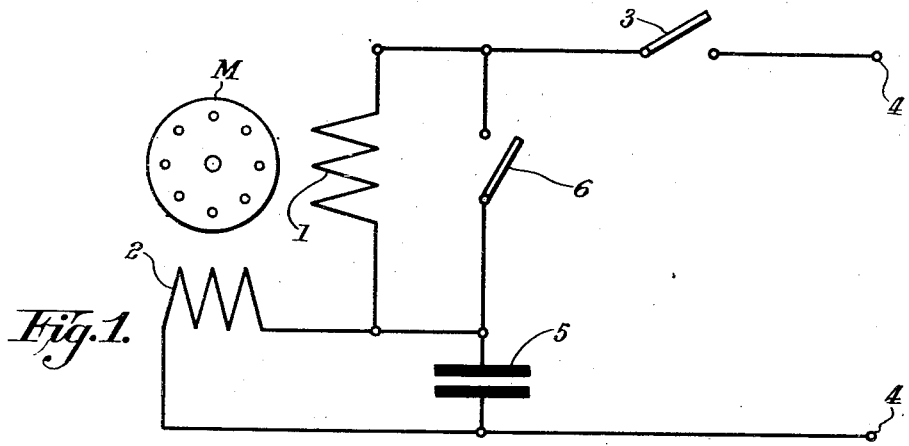

Referring now to Fig. 1, there is shown therein a split-phase induction motor M having a pair of stator windings 1 and 2, spaced apart by 90 electrical degrees, connected in mutual series circuit relation, and by means of switch 3, to the terminals 4—4 of a source of single-phase electrical energy. A capacitor 5 is preferably permanently connected in shunt with the winding 2 and serves as a dephasing means or phase modifier to provide a time phase separation between the currents traversing the windings 1 and 2 to produce a rotating field and hence starting-torque for the motor, as is well known in the art.

Thus far, there has been described a series split-phase induction motor of the permanently-split type and it is clear that closing and opening of the switch 3 will start and stop the motor in the usual manner. In those cases where the inertia of the load connected to the motor (including the motor rotor itself) is large, it will be noticed that the motor coasts for a considerable time after switch 3 has been opened and before the rotor comes to rest. This is because the large stored rotational kinetic energy (due to the large inertia) has to be dissipated slowly by way of the friction and windage losses, which latter are generally purposely made small for reasons of efficiency and heating. For many applications such delay in stopping cannot be tolerated and some means must be found for quickly braking the motor.

This has been accomplished according to this invention by providing a single circuit shunted around the winding 1 and containing a simple switch 6.

It will be noted that closure of this switch 6 simultaneously performs two important circuit changes viz. (1) a short-circuit or path of low electrical impedance is provided for circulating currents in the winding 1, and (2) the full line-voltage at terminals 4—4 is impressed on winding 2, and is approximately 40% greater than the voltage impressed thereon when the switch 6 is open and the motor is running normally. This value of voltage increase is based upon balanced voltages in quadrature on the windings at full load, which is the desired condition. These two factors bring about a vigorous braking effect and quickly cause the motor to come to rest without any tendency to reverse.

It is known in the art to dynamically brake an induction motor by short-circuiting one phase winding and simultaneously applying single-phase energy to a second phase winding thereof. This has been pointed out, for example, in the Austrian Patent No. 109,348 of December 15, 1927, to which reference may be had for further explanation of this effect.

The circuit of Fig. 1, herein, provides not only for short-circuiting a phase winding but also for substantially and simultaneously increasing the voltage applied to the other phase winding by a single simple switching manipulation when braking is desired. It has been found that this voltage increase greatly improves the braking torque and it has been accomplished in this circuit without special motor windings, transformers or relays of any kind.

This circuit has many inherent advantages. For example, during the braking period the capacitor 5 automatically and beneficially serves as a power factor corrector. Due to the series connection of the stator windings, the normal voltage applied to each of them is substantially less than the line voltage. This means that fewer turns are required for each winding than for a shunt connection, thus lessening the difficulty of winding which rapidly becomes the most important single consideration as the physical size of the motor is reduced. It is in this field of small motors up to approximately 1/40 horsepower rated full load that this circuit will probably find its greatest utility.

Figure 2:
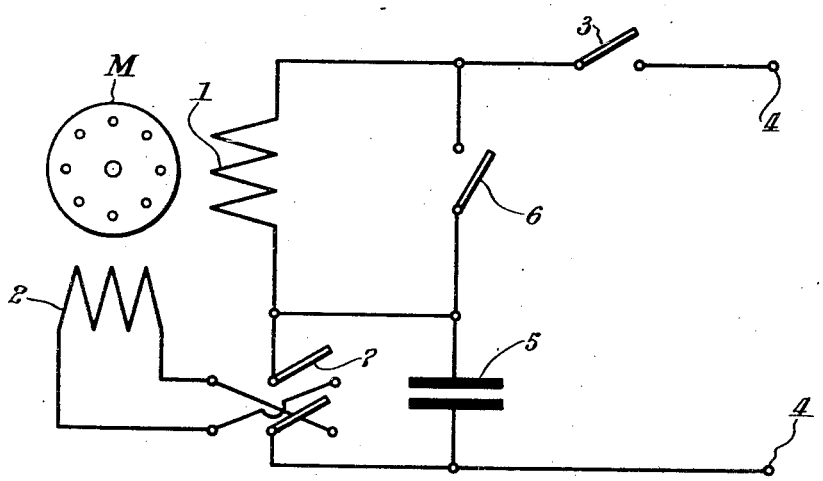
Fig. 2 is an illustration of the circuit of Fig. 1, modified to include operation in both directions of rotation.

The circuit of Fig. 2 illustrates a modification of that of Fig. 1, which enables the motor to be operated selectively in either direction of rotation. A conventional reversing switch 7 has been introduced and is connected so that winding 2 may be reversed in its series circuit relation with winding 1, by operating said switch. This causes the motor to reverse due to reversal of the rotating field. The dynamic braking provided by the closure of switch 6 will always be in a direction to oppose whatever rotation exists at the time of closure.

Figure 3:
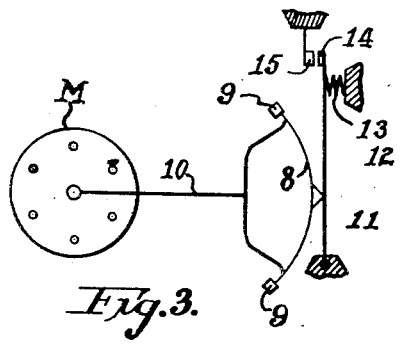
Fig. 3 is a diagrammatic illustration of a modification of a part of the circuit of Fig. 1 in which a motor-operated centrifugal device is used to close a switch for automatic speed control.

It is also contemplated that the circuit of Fig. 1 be operated with switch 3 remaining closed at all times and switch 6 manipulated intermittently to control the speed of the motor M in one direction. Figure 3 shows, for example, a means of securing automatic speed control of the motor M, comprising a known type of centrifugal governor having a bow spring 8 with weights 9 secured by shaft 10 to rotate with the rotor. A contact button 11, secured to the bow spring 8, moves axially in response to the flexing of said spring due to speed changes of the motor. For example, as the motor speeds up, the button 11 moves to the left, an arm 12 follows under the action of a spring 13, and contacts 14 and 15 are brought into engagement with each other, thus braking the motor in accordance with the operation described above in connection with the manual closure of the switch 6. As the motor M slows down, the contacts 14 and 15 separate and the motor again speeds up and repeats the above cycle, thus providing a constant average speed which may be predetermined by adjustment of the contact 15 relative to the movable contact 14. When thus employed, particularly with a low-inertia motor, this combination provides a system of very great sensitivity and accuracy of response.

Since closure of switch 6 causes an increased volts-per-turn and current condition in winding 2, it is clear that prolonging this condition unnecessarily may result (where the motor is not designed for it) in excess heating and ultimate destruction of the motor. Ordinarily this high current condition may be readily terminated by manually opening switch 3 when the rotor comes to rest. However, it may be advisable in some applications of this invention to provide automatic protective means for disconnecting the source of energy from the motor after it has been braked to standstill. It is, of course, necessary to open switch 6, after a braking period, to allow the motor to start again by closure of switch 3.

It is to be understood that the size of capacitor 5 is determined solely on the basis of motoring action, inasmuch as said capacitor is not directly concerned with the braking action at all. This capacitor should, of course, be insulated for the application thereto of full line voltage.

While a capacitor 5 has been shown and is preferred as the dephasing or phase modification means, it is understood that any reactance device, inductive or capacitive, may be employed.

Although this invention has been illustrated as applied to a conventional split-phase motor in which the space phase angle is 90 electrical degrees, it is obviously not so limited, but includes, within its scope, motors having any space angular separation between the axes of its stator windings.

It will be obvious to those skilled in the art that the invention may, without departure from its essential attributes, be embodied in various specific forms other than those shown and described, which latter are to be considered in all respects as illustrative of the invention and not restrictive, reference being had to the appended claims rather than to the foregoing description to indicate the scope of the invention.

Having thus set forth the nature of the invention, what I claim herein is:

1. In a system of motor control, an alternating current supply circuit, an induction motor having two angularly-displaced stator windings connected in series circuit across said supply circuit, dephasing means connected in shunt with one of said windings, and means for selectively shunting said other and normally unshunted one of said windings with a low impedance path whereby to effect braking of said induction motor.

2. In an electrical braking system for induction motors, a source of electrical energy, a self-starting motor having angularly spaced-apart stator windings connected in series across said source of electrical energy, a reactance device connected in shunt with a first one of said stator windings, a second stator winding being normally unshunted, and means for selectively applying a short-circuit around said second one of said stator windings whereby the full voltage of said source is applied to the first one of said windings.

3. In a dynamic braking system, a source of single-phase electrical energy, an induction motor having a pair of angularly-displaced stator windings connected in series with each other and with said source, one of said windings being shunted by a reactance, means for simultaneously short-circuiting the unshunted one of said windings and applying the full voltage of said source to the other of said windings and means for disconnecting said windings from said source.

4. In a system for dynamic braking, a split-phase induction motor having two stator windings with angular space-phase separation, a source of electrical energy, means for connecting said windings in series with each other and with said source, reactance means disposed in shunt relation with the first of said windings to provide a rotating field, and switch means for applying a path of low electrical impedance around the second and normally unshunted one of said windings and simultaneously applying full line voltage to said first winding.

5. In a motor control system, an induction motor having series-connected stator windings with inclined axes, means for reversing the connections of the first one of said windings with respect to the other one, reactance means disposed in shunt circuit relation with the first one of said windings, a source of single phase electrical energy, first switch means for connecting and disconnecting said series-connected windings across said source, and second switch means for connecting and disconnecting a low impedance shunt path around the normally unshunted one of said windings.

6. A braking system for induction motors, comprising a source of alternating-current electrical energy, a motor having angularly displaced stator windings permanently connected in series with each other, first switch means for connecting and disconnecting said series-connected windings across said source, a capacitor permanently connected in shunt with one of said stator windings, and second switch means for selectively applying a shunt path of low electrical impedance around the other and unshunted one of said stator windings.

7. A motor control system comprising, a source of electrical energy, a motor having a pair of phase-displaced stator windings mutually connected in series, a capacitor connected in shunt with a first one of said windings, switch means closable to selectively connect said series-connected windings across said source and dynamic braking connections for said motor including means for applying a circuit of low electrical impedance around the second and unshunted one of said stator windings while said switch means is in its closed position.

8. A motor control system comprising, an alternating current supply circuit, an induction motor having two angularly-displaced stator windings connected in series circuit across said supply circuit, dephasing means connected in shunt with one of said windings, and means for intermittently shunting the other and normally unshunted one of said windings with a low impedance path whereby to effect speed control of said motor.

9. A motor control system comprising, a source of electrical energy, a self-starting motor having angularly spaced-apart stator windings connected in series across said source of electrical energy, a capacitor connected in shunt with a first one of said stator windings, and means for intermittently applying a short-circuit around a second and unshunted one of said stator windings whereby the full voltage of said source is intermittently applied to the first one of said windings to control the speed of said motor.

HARRY B. FUGE.

REFERENCES CITED

The following references are of record in the file of this patent:

UNITED STATES PATENTS

| Number | Name | Date |
|--------|------|------|
| 620,989 | Steinmetz | Mar. 14, 1899 |
| 937,617 | Lindquist | Oct. 19, 1909 |